United States Patent [19]

Idel et al.

[11] Patent Number: 4,487,698

[45] Date of Patent: Dec. 11, 1984

[54] EXTRACTION OF ONIUM SALTS FROM PROCESS WATERS AND WASTE WATERS

[75] Inventors: Karsten Idel; Dieter Freitag, both of Krefeld; Edgar Ostlinning, Duesseldorf, all of Fed. Rep. of Germany

[73] Assignee: Bayer Aktiengesellschaft, Leverkusen, Fed. Rep. of Germany

[21] Appl. No.: 486,884

[22] Filed: Apr. 20, 1983

[30] Foreign Application Priority Data

May 3, 1982 [DE] Fed. Rep. of Germany ....... 3216383

[51] Int. Cl.$^3$ ................................................ C02F 1/26
[52] U.S. Cl. ..................................... 210/639; 210/631; 210/908; 564/281; 568/9
[58] Field of Search .............. 210/631, 634, 639, 908, 210/910; 564/281, 291; 568/9

[56] References Cited

U.S. PATENT DOCUMENTS

| | | | |
|---|---|---|---|
| 2,475,005 | 7/1949 | Brannon | 564/291 |
| 3,158,647 | 1/1964 | Myers | 564/281 |
| 3,816,533 | 6/1974 | Brandstrom et al. | 564/291 |
| 3,855,269 | 12/1974 | Childs | 564/291 |

FOREIGN PATENT DOCUMENTS

| | | | |
|---|---|---|---|
| 57-171940 | 10/1982 | Japan | 564/291 |
| 7903216 | 10/1980 | Netherlands | 210/634 |
| 833949 | 5/1979 | U.S.S.R. | 564/291 |

*Primary Examiner*—Peter Hruskoci
*Attorney, Agent, or Firm*—Connolly and Hutz

[57] ABSTRACT

A process for removing onium salts from aqueous solutions comprising adding a phenolic compound to an onium salt containing aqueous solution, contacting the solution with a water-immiscible organic material whereby the onium salt migrates into the water-immiscible organic material and separating the aqueous phase from the onium salt in the water-immiscible organic material.

5 Claims, No Drawings

EXTRACTION OF ONIUM SALTS FROM PROCESS WATERS AND WASTE WATERS

The present invention provides a process ration and removal of onium salts (especially quaternary phosphonium compounds and in particular quaternary ammonium compounds) from aqueous systems which arise in the production or use of such onium salts.

BACKGROUND OF THE INVENTION

Today, onium salts have a wide variety of uses, for example as textile auxiliaries, disinfectants and as phase-transfer catalysts.

Quaternary ammonium salts in particular are used in the textile industry as textile softeners, viscose additives, auxiliaries for wet fastness or, in dyeing, as levelling agents or retarders and as stripping agents and discharge agents. Furthermore, textiles are rendered antiseptic and antistatic by applying quaternary ammonium salts. In the cosmetics industry and in medicine, the bactericidal, germicidal and fungicidal properties of quaternary ammonium salts are also used for cosmetics and disinfectants. In addition to being used as flotation auxiliaries (for example in the production of potassium salts), as wetting agents in the production of crude petroleum and as emulsifiers in polymerisation reactions, onium salts in general, and quaternary ammonium salts and phosphonium salts in particular, are used as highly active phase-transfer catalysts. A large number of organic reactions, such as substitution, elimination, oxidation, reduction, Wittig and Aldol reactions may be considerably accelerated by means of phase-transfer catalysis. The rapid high molecular weight synthesis in polycondensations in the interphase process is to be mentioned in particular, in which case valuable thermo-plastic plastics materials, such as polycarbonates and polyesters are obtained.

However, the bactericidal effect of quaternary ammonium and phosphonium compounds contained in waste waters from production and/or use of those onium compounds have a deliterious effect on biological clarifying plants normally used to clean water waters. There is then the danger that the bacterial cultures of the clarifying plant may be severely affected or killed. If a decomposition of quaternary ammonium compounds is to be expected at all in a biological clarifying plant, then it is only a very slow and incomplete decomposition. However, decomposition is required by law. Thus, it would be desirable to remove onium compounds from the waste water before being sluiced into the clarifying plant.

SUMMARY OF THE INVENTION

Surprisingly, it has now been found that quaternary ammonium and/or phosphonium compounds may be easily extracted from aqueous solutions and transferred into the organic phase by adding phenols or salts thereof together with a water-immiscible solvent. The aqueous systems which are freed from the onium salts in this manner may then be introduced into the biological clarifying plant in a straightforward manner and then fed into the sewage system. Aqueous systems treated in this manner have minimal detrimental effect on the bacterial flora of the clarifying plant.

DETAILED DESCRIPTION OF THE INVENTION

Monophenols and di-, tri- and polyphenols are suitable for the process according to the present invention. Phenols which carry alkyl radicals are particularly suitable, in which case, however, the emulsifying effect of the phenols should not be so strong as to complicate subsequent phase separation.

Monophenols are phenols corresponding to the general formula (1):

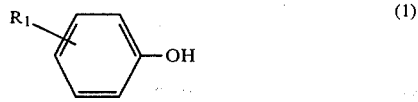

wherein $R_1$ may preferably be in the meta- or para-position and represents a $C_1$–$C_{18}$ alkyl or cycloalkyl radical, a $C_6$–$C_{24}$ aryl, alkaryl or aralkyl radical.

The radical $R_1$ may carry substituents and may be either straight- or branched-chain. $R_1$ may also contain functional groups, for example ether, thioether, keto, and epoxy groups, halogen atoms and/or heterocyclic rings or may carry these as substituents. Several radicals $R_1$ may also be attached to the aromatic compound, but an ortho-disubstitution of the phenol is not so favorable. The following phenols, for example, may be used according to the present invention:
3-methylphenol,
4-methylphenol,
3-ethylphenol,
4-ethylphenol,
3-n-propylphenol,
4-n-propylphenol,
3-n-butylphenol,
4-n-butylphenol,
3-tert.-butylphenol,
4-tert.-butylphenol,
3-n-pentylphenol,
4-n-pentylphenol,
4-n-isopentylphenol,
4-n-hexylphenol,
4-isohexylphenol,
4-cyclohexylphenol,
2-methyl-4-cyclohexylphenol,
4-n-heptylphenol,
4-isoheptylphenol,
4-n-octylphenol,
4-isooctylphenol,
4-n-nonylphenol,
4-isononylphenol,
4-n-decylphenol,
4-isodecylphenol,
n-undecylphenol,
n-dodecylphenol,
isodecylphenol,
n-tetradecylphenol,
n-stearylphenol,
4-phenylphenol,
4-tolylphenol,
4-(2-ethoxyethyl)-phenol,
4(2-propoxyethyl)-phenol,
4(3-ethoxypropyl)-phenol,
4-butoxy-phenol,
4-(2-ethoxybutoxy)-phenol,
4-(2-ethoxyhexyl)-phenyl, 4-mercaptobutyl-phenol,
4-(1-acetylethyl)-phenol, and
4-(1-acetylbutyl)-phenol.

Phenols which carry an optionally substituted $C_4$-$C_{12}$ radical $R_1$ according to formual (1) are preferred.

The following phenols are particularly preferred:
4-tert.-butylphenol,
4-isooctylphenol,
4-n-decylphenol,
4-isodecylphenol,
4-n-decylphenol, and 4-cyclohexylphenol.

Bisphenols which correspond to the general formulae (2) and (3) are included as suitable bisphenols:

$$\underset{R_2}{\overset{HO}{\diagdown}}\diagup\overset{R_3}{\diagdown}OH \quad (2)$$

$$HO\diagup\overset{R_3}{\diagdown}-X-\overset{R_4}{\diagdown}\diagup OH \quad (3)$$

in which formulae $R_2$, $R_3$, $R_4$ and $R_5$ which may be the same or different, each represents as hydrogen atom, a $C_1$-$C_{12}$ alkyl or cycloalkyl radical which may be substituted, or a halogen atom such as bromine or chlorine, and X represents a direct bond, a $C_2$-$C_{18}$ alkylene or cycloalkylene radical, a $C_1$-$C_{18}$ alkylidene or cycloalkylidene radical, a heterocyclic radical which may also be condensed at one or both aromatic nuclei, a bicyclic ring system, for example the norornylidene radical, a function group such as $$\overset{O}{\underset{\|}{-C-}},$$

—O—, —S—, —SO—, —SO$_2$— or X can be a radical corresponding to the general formuale (4a) and (4b):

$$-\overset{CH_3}{\underset{CH_3}{\overset{|}{C}}}-\diagup\diagdown-\overset{CH_3}{\underset{CH_2}{\overset{|}{C}}}- \quad (4a)$$

$$-\overset{CH_3}{\underset{CH_3}{\overset{|}{C}}}-\diagup\diagdown-\overset{\overset{CH_3}{|}}{\underset{CH_3}{\overset{|}{C}}}- \quad (4b)$$

The following bisphenols, for example may be used:
2,2-bis-(4-hydroxyphenyl)-propane,
1,1-bis-(4-hydroxyphenyl)-cyclohexane,
2,2-bis-(4-hydroxyphenyl)-butane,
2,2-bis-(4-hydroxyphenyl)-pentane,
2,2-bis-(4-hydroxyphenyl)-hexane,
2,2-bis-(4-hydroxyphenyl)-octane,
2,2-bis-(4-hydroxphenyl)-decane,
2,2-bis-(4-hydroxyphenyl)-dodecane,
2,2-bis-(4-hydroxyphenyl)-hexadecane,
2,2-bis-(4-hydroxyphenyl)-octadecane,
2,2-bis-(3-chloro-4-hydroxyphenyl)-propane,
2,2-bis-(3-methyl-4-hydroxyphenyl)-propane,
2,2-bis-(3-methyl-4-hydroxyphenyl)-cyclohexane,
2,2-bis-(3-methyl-4-hydroxyphenyl)-dodecane,
2,2-bis-(3-methyl-4-hydroxyphenyl)-hexadecane,
2,2-bis-(3,5-dimethyl-4-hydroxyphenyl)-propane,
4,4'-dihydroxydiphenylether,
4,4'-dihydroxydiphenylthioether,
α,α-bis-(4-hydroxyphenyl)-p-diisopropylbenzene,
2,2-bis-(4-hydroxphenyl)-norbornane, and
1,1,3,4,6-pentamethyl-3-(3,5-dimethyl-4-hydroxyphenyl)-indan-5-ol.

Bisphenols having a comparatively high aliphati proportion are preferably used.

Triphenols, tetraphenols and generally polypheno may also be used. For example, 2,4-bis-(4-hydroxy phenylisopropyl)-phenol and 1,4-bis-84,4'-dihydroxy triphenyl-methyl)-benzene, and 1,1,4,4-tetra-(4-hydro yphenyl)cyclohexane are useful.

Oniums salts, in particular quaternary phosphoniur salts and more particularly quaternary ammonium sali are suitable subjects for the extraction according to th present invention. When the subject to be extracted ar quaternary ammonium salts, the nitrogen atom may b present in open-chain and in cyclic systems. The substi uent radicals on the nitrogen atom may be the same c different and represent a $C_1$-$C_{18}$ alkyl or cycloalky radical and/or a $C_6$-$C_{24}$ aryl, alkaryl or aralkyl radica Two substituent radicals may also be joined in each cas to form a ring so that together with the nitrogen ator they form a heterocyclic system. Several quaternar ammonium compounds may also be joined together by for example, alkylene groups. The substituent radica on the nitrogen atom may optionally be substituted. Fc example, those quaternary ammonium salts having fro 4 to 72 carbon atoms and from 1 to 3 nitrogen atoms ar suitable:
tetramethlyammoniumbromide,
tetra-ethylammonium chloride,
tetra-ethylammoniumbromide,
tetra-n-propylammoniumbromide,
tetra-n-butylammoniumbromide,
tetra-n-butylammoniumiodide,
tetra-n-hexylammoniumbromide,
tetra-n-oxtylammoniumbromide,
tetra-n-decylammoniumbromide,
tri-octyl-methyl-ammoniumsulphate,
tri-octyl-methyl-ammoniumiodide,
N-methyl-N-decylmorpholiniumbromide,
N-methyl-N-butylmorpholiniumbromide,
N-methyl-N-octylmorpholiniumbromide,
N-methyl-N-cetylmorpholiniumbromide,
N-methyl-N-benzylmorpholiniumbromide,
N-methyl-N-benzylmorpholiniumchloride,
N-methyl-N-ethylmorpholiniumbromide,
N-methyl-N-ethylpyrrolidiniumbromide,
N-methyl-N-butylpyrrolidiniumbromide,
N-methyl-N-cetylpyrrolidiniumbromide,
N-methyl-N-octylpyrrolindiniumbromide,
N-methyl-N-benzylpyrrolidiniumchloride,
N(2-hydroxyethyl)-N-ethylpiperidiniumbromide,
N-(2-hydroxyethyl)-N-butylpiperidiniumbromide,
N-(2-hydroxyethyl)-N-octylpiperidiniumbromide,
N-(2-hydroxyethyl)-N-benzylpiperidiniumchloride,
tripropylhexylammoniumbromide,
tripropylcetylammoniumbromide,
N-ethyl-N-butyl-piperodiniumbromide tricyclohexylethylammoniumbromide,
benzyltributylammoniumbromide,
benzyltrimethylammoniumchloride,
hexadecylpiperidiniumchloride,
hexadecyltrimethylammoniumbromide,
phenyltrimethylammoniumbromide,
tetrabutylammoniumhydrogensulphate,
tetra-ethylammoniumhydrogensulphate,
tetra-ethylammonium-4-toluenesulphonate,
tetradecylammoniumperchlorate,
tricaprylmethylammoniumbromide, and
dimethyl-triethylenediammoniumbromide.

When the extraction involves quaternary phosphonium salts, the phosphorus atom may be present in open-chain and in cyclic systems. Substituents of the phosphorus atom may be the same or different and they are generally the same as the radicals of the quaternary ammonium salts. Several quaternary phosphonium salts may be joined together by, for example alkylene groups. The substituent of the phosphorus atom may optionally be substituted. For example, those quaternary phosphonium salts which have from 4 to 72 carbon atoms and from 1 to 3 phosphorus atoms are suitable:
tetramethylphosphoniumbromide,
tetra-ethylphosphoniumchloride,
tetra-ethylphosphoniumbromide,
tetra-n-propylphosphoniumbromide,
tetra-n-butylphosphoniumbromide,
tetra-n-butylphosphoniumiodide,
tetra-n-hexylphosphoniumbromide,
tetra-n-octylphosphoniumbromide,
tetra-n-decylphosphoniumbromide,
tri-n-decyl-methyl-phosphoniumbromide,
tri-phenyl-cetyl-phosphoniumbromide,
tri-phenyl-benzyl-phosphoniumbromide,
tri-phenyl-methyl-phosphoniumbromide,
tri-phenyl-ethyl-phosphoniumchloride, and
tri-phenyl-butyl-phosphoniumbromide.

The following are used as the inert, water-immiscible organic phase with which, combined with the phenols according to the present invention, the quaternary ammonium and/or phosphonium salts are extracted from aqueous systems: benzene, toluene, xylene and ethyl acetate, chlorinated aliphatic hydrocarbons, such as methylene chloride, chloroform and 1,2-dichloroethane and chlorinated aromatic hydrocarbons, such as chlorobenzene, dichlorobenzene, chlorotoluene and chloroxylene.

The ratio of volume of the organic, waterimmiscible phase to the aqueous phase should be determined for each particular quaternary ammonium and/or phosphonium salt. This ratio also depends on the time and intensity of mixing of the two phases. However, in general the ratio of volumes of the organic phase to the aqueous phase may range from 1:25 to 10:1. If necessary, extraction may be carried out under pressure and at an elevated temperature of from 20° C. to 200° C., prefearbly from 20° C. to 100° C. The mixing time of the aqueous phase with the onium salt and the organic phase plus phenol may range from 0.1 to 1800 seconds. The transition of the quaternary ammonium and phosphonium salts into the organic phase generally takes place rapidly, so that the mixing times lie in the lower region of the above-mentioned time interval. The molar ratio of quaternary ammonium or phosphonium salt to phenol is from 1:1 to 1:100, preferably from 1:1 to 1:25. The pH of the aqueous phase should be neutral to basic. Extraction itself may be carried out in conventional systems, for example in mixer-separator systems. Salts which are often found in the waste water, such as chlorides and sulphates do not have a disadvantageous effect, instead they even promote the removal of the onium salts from the aqueous phase. Organophilic phenols, in particular those which have comparatively long alkyl chains show the best extraction effect. They pass over into the organic phase in an almost quantitative manner together with the mentioned proportion of quaternary ammonium or phosphonium salts and may be recovered from this phase. For example, by distilling the organic phase after extraction, the organic solvent, the phenol component and the quaternary ammonium or phosphonium salt may thus be recovered. The organic solvent and the phenol component may then be re-used according to the present invention and, in addition to the removal of the non-decomposable onium salts from the waste water, it is also possible to recover the quaternary ammonium or phosphonium salts which are valuable to some extent.

EXAMPLES

Example 1 (Comparison without added phenolics)

In an experiment outside the scope of the present invention, 880 g of an aqueous solution containing 352 ppm of tetra-n-butylammoniumbromide (TBAB) (1.1 m mol) are mixed with 880 g of methylene chloride. The two phases are mixed intensively for 20 minutes. The aqeous phase is then separated and the quantity of TBAB is determined.

After extraction, only a small amount of TBAB has passed over into the methylene chloride phase. 315 ppm of TBAB remain in the aqueous phase and only 37 ppm of TBAB have been extracted.

Example 2

As described in Example 1, 880 g of an aqueous solution containing 352 ppm of tetra-n-butylammoniumbromide (TBAB) (1.1 mmol) are introduced. 1.66 g of a 45 % sodium hydroxide (18.75 mmol of NaOH) and 3.83 g (18.75 mmol) of p-isooctylphenol are also added and are mixed intensively with 880 g of methylene chloride for 20 minutes. After phase separation, the residual content of TBAB in the aqueous phase is determined: 5–6 ppm of TBAB. In contrast to Example 1, the onium salt has been removed almost quantitatively from the aqueous phase.

Example 3

An experiment was performed in analogous manner to Example 2, but a different phenol is used. Instead of 3.83 g of isooctylphenol (18.75 mmol), 2.81 g of p-tert.-butylphenol (18.75 mmol) are used. After phase separation, only 9 ppm of tetra-n-butylammoniumbromide (TBAB) are still contained in the aqueous phase (before extraction: 352 ppm of TBAB).

Examples 4 to 8

Experiments were performed using the same aqueous solution as described in Examples 1 to 3 containing 352 ppm of tetra-n-butylammoniumbromide (TBAB). According to Example 2, a molar excess, based on the mols of TBAB of p-isooctylphenol (IOP)/NaOH is added and extraction is then carried out with methylene chloride. Different mol quantities of p-isooctylphenol (IOP)/NaOH, based on the mols of TBAB show a different efficiency with respect to the extraction of the onium salt.

| Example | Mols of IOP/NaOH: Mols of TBAB | ppm of TBAB in the aqueous phase before and after extraction | |
|---|---|---|---|
| 4 | 5 | 352 ppm | 98 ppm |
| 5 | 10 | 352 ppm | 29 ppm |
| 6 | 15 | 352 ppm | 10 ppm |
| 7 | 20 | 352 ppm | <5 ppm |
| 8 | 25 | 352 ppm | <5 ppm |

Extraction time was 20 minutes. Same quantities of aqueous phase and methylene chloride phase.

Examples 9 to 13

Experiments were carried out as described in Examples 4 to 8, except the p-cyclohexylphenol (CHP) is used instead of p-isooctylphenol.

| Example | Mols of CHP/NaOH Mols of TBAB | ppm of TBAB in the aqueous phase before and after extraction | |
|---|---|---|---|
| 9 | 5 | 352 ppm | 178 ppm |
| 10 | 10 | 352 ppm | 47 ppm |
| 11 | 15 | 352 ppm | 11 ppm |
| 12 | 20 | 352 ppm | 6-5 ppm |
| 13 | 25 | 352 ppm | <5 ppm |

Examples 13 to 17

Experiments were performed in analogous manner to Example 2, but the extraction times were clearly reduced. As shown by Examples 13 to 16, no difference may be seen in the extraction effect between 20 minutes and 1 minute mixing time. The extraction effect is hardly reduced either in the case of only 30 seconds mixing time (Example 17).

| Example | Mixing time | ppm of TBAB in the aqueous phase before and after extraction | |
|---|---|---|---|
| 13 | 20 Min. | 352 ppm | <5 ppm |
| 14 | 10 Min. | 352 ppm | <5 ppm |
| 15 | 5 Min. | 352 ppm | <5 ppm |
| 16 | 1 Min. | 352 ppm | <5 ppm |
| 17 | 0.5 Min. | 352 ppm | 5-6 ppm |

Example 18

1000 g of an aqueous solution containing 820 ppm of tetra-n-decylammoniumbromide (TDAB) (1.24 mmol) are extracted with 1000 g of methylene chloride over a period of 5 minutes. After phase separation, 765 ppm of TDAB remain in the aqueous phase.

The experiment is repeated, but 1.1 g (12.4 mmol) of 45 % sodium hydroxide and 1.86 g (12.4 mmol) of p-tert.-butylphenol are added before extraction. After extraction and phase separation, only 6 ppm of TDAB are still found in the aqueous phase.

Example 19

The aqueous solution according to Example 2 containing 352 ppm of tetra-p-butylammoniumbromide (TBAB) is mixed with 7.8 g of a 45 % sodium hydroxide (88 mmol) and 10.0 g of bishpenol A (bis-(4-hydroxyphenyl)-propane-2,2) (44 mmol) and is then shaken out for 20 minutes with the same weight of methylene chloride. After phase separation, only <5 ppm of TBAB are in the aqueous phase.

Example 20

The extraction according to Example 2 is repeated. The amount of p-isooctylphenol in the aqueous phase which, after extraction still only contains 5 to 6 ppm of TBAB is determined: 7 ppm of p-isooctylphenol. Thus, after the onium salt has been removed, the waste water is not charged with the p-isooctylphenol which has been added within the context of the present invention, because this remains in the organic phase.

Example 21

1000 g of an aqueous solution containing 550 ppm of triphenylbenzyl-phosphoniumchloride (1.42 mmol) are extracted with 1000 g of methylene chloride for 1 minute by adding 2.21 g (25 mmol) of a 45 % sodium hydroxide and 5.1 g (25 mmol) of p-isooctylphenol. After phase separation, only 7 ppm of triphenyl-benzyl phosphonium chloride can still be determined in the aqueous phase.

What is claimed is:

1. A process for removing onium salts from aqueous solutions comprising the steps of adding a phenolic compound to an onium salt containing aqueous solution, contacting the solution with a water-immiscible organic material to produce an aqueous phase and an organic phase whereby the onium salt migrates from the aqueous phase into the water-immiscible organic material, wherein the aqueous solution has a pH of 6 to 14, the molar ratio of onium salt to added phenolic compound is from 1:1 to 1:100, and the volume ratio of water iamissible organic phase to aqueous solution is about 1:25 to 10:1, and separating the aqueous phase from the water-immiscible organic material containing onium salt, wherein said phenolic compound is a triphenol, tetraphenol or a polyphenol or is a phenol of the formula

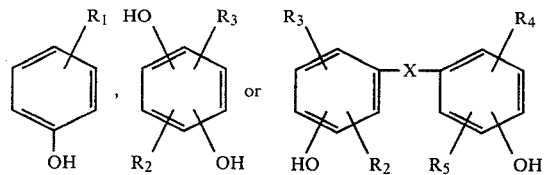

wherein

R₁ is meta or para to the -OH and is alkyl or cycloalkyl having 1 to 18 carbon atoms, aryl having 6 to 24 carbon atoms, alkaryl having 6 to 24 carbon atoms or aralkyl having 6 to 24 carbon atoms and is unsubstituted or substituted by halogen and can also include an ether, thioether, keto or epoxy moiety;

R₂, R₃, R₄ and R₅ are the same or different and each represents hydrogen, alkyl or cycloalkyl having 1 to 12 carbon atoms either unsubstituted or substituted by halogen; and X is a direct bond, alkylene or cycloalkylene having 2-18 carbon atoms, alkylidene or cycloalkylidene having 1-18 carbon atoms, a heterocyclic moiety which can be condensed to the aromatic nuclei, a bicyclic ring system,

—O—, —S—, —SO—, —SO₂—, or a moiety of the formula

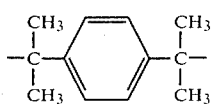

or

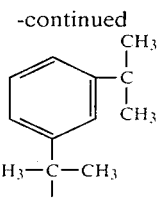

2. A process according to claim 1 wherein the added phenolic compound has one to four phenolic —OH moieties.

3. A process according to claim 2 wherein the added phenolic compound is a monophenol, bisphenol, triphenol or tetraphenol with each being substituted by alkyl having 4 to 6 carbon atoms.

4. A process according to claim 1 wherein the onium salt is a quaternary phosphonium salt, a quaternary ammonium salt or mixtures thereof.

5. A process according to claim 1 wherein the aqueous solution and the water-immiscible organic material is intensively mixed from about 0.1 to about 1800 seconds at a temperature of about 20° to 200° C.

* * * * *